Jan. 1, 1935. S. D. MILLIGAN 1,986,007
TRANSPORT APPARATUS
Filed April 25, 1934 2 Sheets-Sheet 1
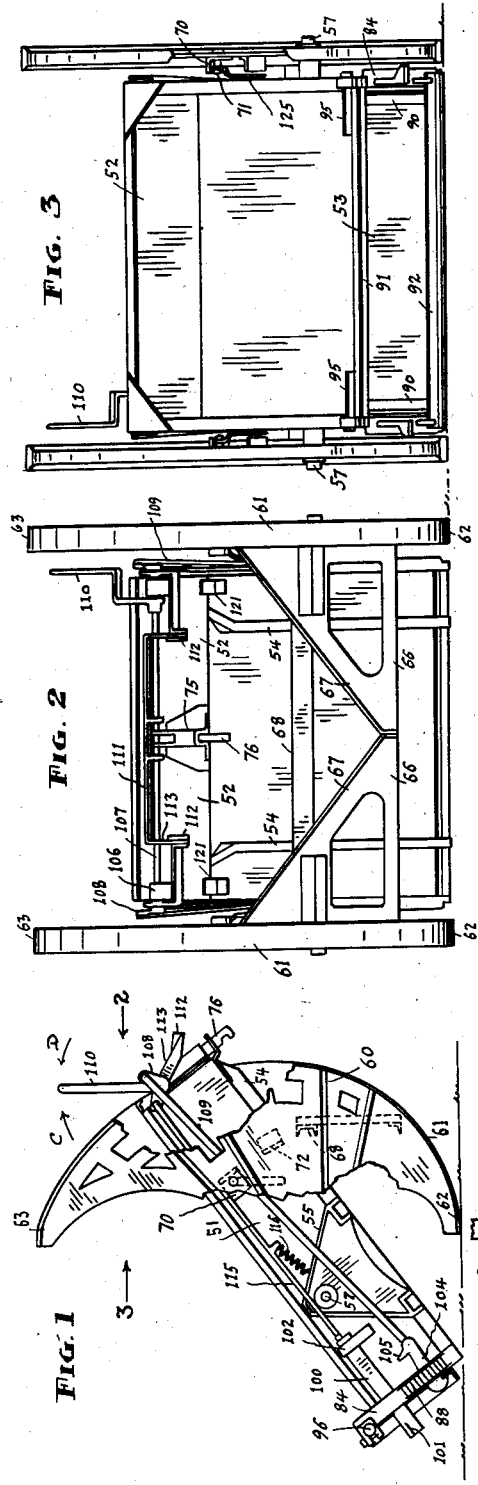
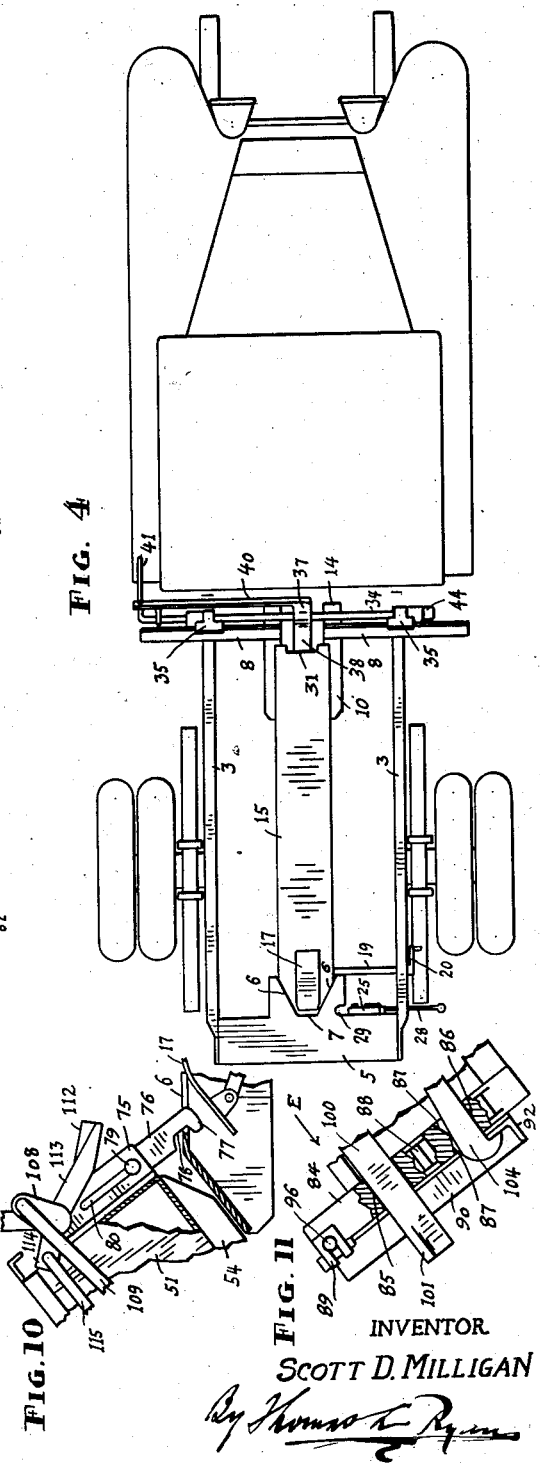
INVENTOR.
SCOTT D. MILLIGAN
ATTORNEY.

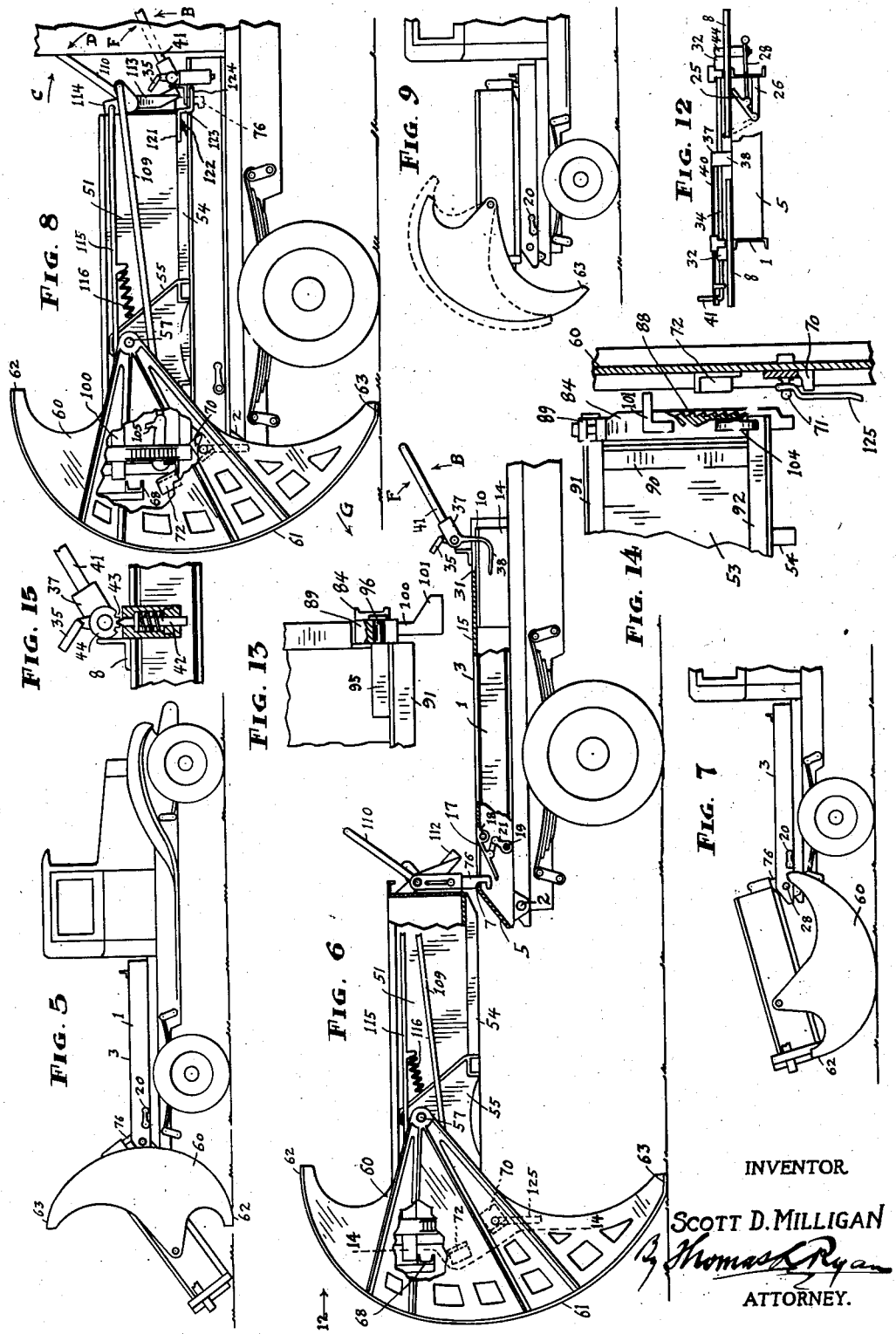

Patented Jan. 1, 1935

1,986,007

UNITED STATES PATENT OFFICE 1,986,007

TRANSPORT APPARATUS

Scott D. Milligan, Muncie, Ind.

Application April 25, 1934, Serial No. 722,321

7 Claims. (Cl. 214—65)

This invention relates to improvements in apparatus intended for the handling of heavy bulk material. By the word "handling" as used herein, is meant the loading for transport, and the transporting and the unloading of said material.

Having in mind the usefulness and adaptability of motor driven vehicles for the moving and transporting of loads under difficult conditions, my present invention has proceeded upon the thought of providing, in combination with a motor truck of the above description, a device (hereinafter designated as a skip) comprising a material-receiving and retaining receptacle and lifting and lowering means therefor of such combination and arrangement, that the skip with its contents, may be superposed on the truck, transported, and emptied, by the power afforded by the truck.

In the present embodiment, the invention is intended especially for the handling of material such as quarried stone and the like. In the handling of stone as obtained directly from the quarry, there has long been the problem of how best to transport same, not only from place to place over comparatively level surfaces, but from the quarrying levels to the substantially higher plane or level where ultimate disposition of the stone is to be made.

My invention in its broad conception, contemplates the providing of a unit embodying a box like bed, a cradle device and connections for the bed to support the latter in position to receive its charge, the said cradle device and connections being so operable, that by the power of the truck when the latter is operated in coupled relation with the bed, the said unit is raised and it becomes superposed upon and made fast to the chassis of the truck, and by the power of the truck the said unit may be transported to destination, and may be emptied, and may be lowered and detached from the truck.

My invention is embodied in, and its general objects, as well as its more specific purposes to be presently pointed out, are accomplished by the new construction, combination, and arrangement of parts described in the following specification, and illustrated in the accompanying drawings. The several parts of the invention are identified in the different views in the drawings by suitable characters of reference applied to them.

Figure 1 is a side view of the skip, a portion of the obverse cradle member thereof being broken away.

Figure 2 is an end view taken in the direction of arrow 2 in Figure 1.

Figure 3 is an end view taken in the direction of arrow 3 in Figure 1.

Figure 4 is a top plan view of a conventional motor truck, and in whose chassis, the structural features having to do with the present invention, are embodied.

Figure 5 is a view on reduced scale, of my improved apparatus in readiness for operation, the truck having been moved rearwardly to the skip, and having been coupled thereto.

Figure 6 is a side view of the apparatus, showing the relative positions of the several parts, after the truck will have moved forwardly such distance that the cradle will have lifted the bed to the desired height, and will have become locked against reverse movement.

Figure 7 is a view, on reduced scale, showing the relative positions of the bed and the cradle, as the truck is moving forwardly.

Figure 8 is a side view of the apparatus, showing the relative positions of the several parts, after the truck will have moved rearwardly such distance that the bed will have been imposed thereon, and the cradle will have been unlocked. In this view a portion of the obverse cradle member is broken away.

Figure 9 is a side view, on reduced scale, showing the cradle supported in its raised position, and clear of the ground.

Figure 10 is a detached enlarged detailed side view of the forward end of the bed.

Figure 11 is a detached enlarged detailed side view of the rearward or gate end of the bed.

Figure 12 is an end view of the truck chassis as seen in the direction of arrow 12 in Figure 6.

Figure 13 is an enlarged detached detailed top plan view of the end gate connection.

Figure 14 is an enlarged cross section view taken on the line 14—14, in the direction of arrow 12, in Figure 6, showing the corner post and end gate connection, and the relative position of the adjacent cradle member and the chuck bar 125.

Figure 15 is a detailed side view of the device for actuating the means for retracting the slide bolts 100, and for raising the finger member 38.

For use in connection with a truck of conventional type as illustrated, the skip is of the proportions as shown, the bed being about five feet in width, and about six feet in length. The truck chassis embodies a usual hoisting frame having the side beams 1 and which said frame is pivoted to the truck frame as at 2. The mechanical means for raising and lowering said hoisting frame being common, any description of same herein is deemed unnecessary.

The surfaces of the top flanges of the beams 1, constitute parallel runways 3. Between the rear ends of said beams, a cross plate is secured at an angle to constitute an inclined plane 5. Convergent guideways 6 at the front of said plane lead to the central portion of its edge and which is designated as a draft lip 7. At a predetermined advanced position on the said beams are secured aligned transverse stop bars 8 whose proximate ends are secured to a plate 10 that is made fast to support members 14. A centrally disposed deck plate 15 whose forward end is secured to plate 10 has its rear end in connection with the inclined plane 5. A central tongue 17 which is downwardly inclined, as shown in Figure 6, is pivotally supported as at 18. A cross shaft 19 which is journaled adjacent thereto, and which is provided with a hand crank 20, is connected to said tongue by a toggle connection 21. A stop bar 25, pivoted at its lower end on a suitable stud 26, rests by gravity in a retracted position, as shown in Figure 12. This stop bar is manually operable to and from the broken line position (see Figure 12) as by a hand rod 28. In the broken line position the stop bar rests in the recess 29 provided therefor at the inclined plane 5. The function of this stop bar 25, and of the tongue plate 17, will be presently referred to.

The forward end of the said deck plate 15 is designated as a retention lip 31. Journaled in pillow blocks 32 that are secured to the stop bars 8, is a cross shaft 34. Secured on said cross shaft are spaced detents 35, as shown in Figures 4 and 8.

On one end of said cross shaft 34 is a hand lever 41 which is accessible from the truck cab. A crank head 37 which is journaled on the said cross shaft at its mid-portion, has an integrally formed finger 38 that extends downwardly and rearwardly and is intended for the function presently to be described.

Extending from said crank head 37 is an arm 40 that is parallel with said cross shaft and is engaged with the said hand lever 41. A spring pressed click 42 which is retained in a housing that is secured to one of the stop bars 8, engages one of three notches 43 in a head member 44 that is secured to cross shaft 34. By this arrangement, the cross shaft, while capable of being moved by the hand lever 41, is stayed in the neutral position or in either of the two other positions to which it may be moved.

The bed consists of a box-like sheet metal receptacle having side walls 51, front wall 52, and rear wall or gate 53. Longitudinal runners 54 are secured to the bottom of the bed and they are spaced to register with the runways 3 of the truck. Substantial cast metal reinforce members 55 having cross ribs that engage the undersides of the bed, are secured to the side walls 51. In lateral bosses which are integral with said reinforce members, are secured the substantial spindles 57.

A cradle, to support the bed in the inclined position as shown, and which will function to carry and at the same time lift the bed, when the latter is drawn forwardly, consists of the construction as follows: At each side of the bed, a sector-like structure 60 which is of formation as illustrated in the drawings, has its hub portion journaled on the spindle 57. The treads 61 of these sectors are of involute form and they are terminated by straightened portions designated at feet 62 and 63. A strut frame to retain these sectors in their opposed spaced relation, consists of cross members 66, diagonal 67, and a cross beam 68 all of which are united to each other and to the sectors by suitable gusset plates and angle connections. The position of the cross beam 68 with reference to the hub centers of the sectors is such that when the feet 62 and 63 are in a substantially vertical plane, the bed is supported at an angle of about thirty-eight degrees. At this angle of incline, the position of the bed is of stability such that the charge of material may be deposited therein until the bed is completely filled. Upon the inner side of each sector, is secured a bracket 70 with headed stud 71; and a second and similar bracket 72, the said brackets being in the inclined positions as indicated by the broken lines in Figure 1, and in the detail view in Figure 14.

Secured at central position on the front wall 52 of the bed, is a housing 75 in which is slidingly retained a pawl 76 having rounded nose 77. In the rear side of the lower portion of said pawl is a recess 78. This pawl, by gravity, is normally at the position as shown in Figure 10, its movement downwardly being limited by a stud 79 that engages the lower end of slot 80. At the rear end of each of the side walls of the bed is secured a corner post 84 provided with an upper guideway 85, and a lower guideway 86. The surfaces 87 of the upper side of the guideway 86 are divergent and are inclined upwardly, as shown in Figure 11. The outer face of each of said posts 84 is provided with ratchet teeth 88, and integral with the top of each post is a bearing head 89. The gate wall plate 53 of the bed, has the upright end flanges 90, and the horizontal top and bottom flanges 91 and 92 respectively. At the upper inner face of each end of the said gate wall, is secured a stub bar 95 with the integral headed pintle 96. These pintles are pivotally retained in the said bearing heads 89 of the said corner posts.

A movable member, designated as a slide bolt 100, and which has transverse flange 101 at its outer end, is slidingly retained in the said guideway 85 and in a guideway bracket 102 which is secured to the side wall of the bed. Loose in the lower guideway 86 is a hook 104 which engages the projecting end portion of the lower flange 92 of the gate, as shown in Figures 1 and 11. A lug 105 on said hook and which is spaced from the end thereof, performs the function presently to be described.

Journaled in pillow blocks 106 which are secured to the front wall 52 of the bed, is a cross rod 107 upon whose ends are secured cranks 108. Connecting the cranks 108 and the said hooks 104, are the connecting rods 109. By moving (in the direction of arrow C in Figure 1) the hand lever 110 which is secured to said cross rod 107, the hooks 104 are pushed rearwardly, and apart from the flanges 92. When the lug 105 comes into engagement with the post 84, the hooks assume inclined positions, their upper edges engaging the surfaces 87 of the guideway 86, and the hooks being thereby clear of the flange 92. The end gate is now unlocked and is capable of being swung to open position. To lock the gate, the lever 110 is operated in the direction of arrow D whence the cranks 108, rods 109 and hooks 104 are returned to their positions as shown in Figure 1. The forward upwardly inclined surface 87 of the guideway 86 permits the hook to readily assume engagement with the flange 92 of the end gate, as shown in Figure 1 and Figure 11. The cranks 108 being slightly above dead center, and the tendency of the connected parts being to lower, there is at all times a suitable tension on the hooks to hold them firmly against dislodgment, the end gate being thereby held firmly in the closed position.

Journaled on the cross rod 107 (see Figure 2) is a swing arm structure 111 with crank ends 114, and with spaced arms 113 on whose free ends are provided inclined heads 112. Connecting the crank ends 114 and the aforesaid slide bolts 100 are the connecting rods 115. A stout spring 116 having one end secured to connecting rod 115 and the other to the side wall of the bed, urges the said slide bolt 100 in the direction of arrow E (see Figure 11) or to rearward position, and the crank arms 113 in the opposite direction.

Near the forward end of the bed, at each side thereof, is a check clip 121 which is made fast at adjusted position, as by a set nut 122. The said clip has knee portion 123 and projection 124. The function of these clips will presently be pointed out.

Loose on the stud 71 of each of the cradle sectors, is a chuck bar 125 which is adapted to be disposed with its blunt end in engagement with the ratchet toothed sides of the corner posts 84 of the rear end of the bed. See Figures 3, 6, and 14.

My invention may be practiced in accordance with the description as follows:

The skip is manually maneuvered to the desired specific location where the work of filling the bed is to be done. It will be understood that the end gate is in the closed position, and the several parts are in the positions as shown in Figures 1 and 11.

The bed having been filled, the truck is now moved rearwardly thereto. As the plane 5 comes to close proximity with the skip, the pawl 76 is borne upwardly on said plane, whence it drops to position between the guideways 6 and into the space at the draft lip 7. The truck is now operated forwardly, and in such movement thereof, the recess 78 of the pawl is engaged with the draft lip and the bed is being pulled forwardly; the cradle (as illustrated in Figure 7) besides supporting the bed causes it to be lifted until, when it shall have been elevated to the height that its rear end is slightly above the plane of the runways 3, the spindles 57 will have reached a position in advance of the perpendicular of the feet 62 of the cradle. The cross beam 68 will have come to engagement with the undersides of the slide bolts 100, and the cradle will thereby have become locked against further forward movement, and against reverse movement. Such shock as may be incident to the stop of the cradle is absorbed by the chassis springs of the truck.

The truck is now operated rearwardly, the pawl 76 riding upwardly on the tongue plate 17, the runways 3 sliding along under the runners 54, and the deck plate 15 sliding along underneath the rounded nose 77 of the pawl which is resting thereon. As the end of this rearward travel of the truck is reached, and the heads 112 impinge against the stop bars 8 (see Figure 8) the swing arm structure 111 is moved, thereby actuating the cranks 114. In this actuation, the slide bolts will have been moved forwardly to the position as shown in Figure 8, and clear of the cross beam 68. The pawl 76 will have dropped into engagement with the retention lip, as shown by the broken lines in Figure 8.

At this stage, the bed is borne partially by the truck, and partially by the cradle. The truck is now operated slightly forwardly. In this movement the weight of the bed is transferred from the cradle, and it is now borne entirely by the truck.

Coincidentally with the movement of the swing arm structure 111, the stop bars 8 will have been engaged by the knees 123 of the check clips 121, and the projections 124 of said clips will have come to position underneath the said stop bars. By this arrangement, undue pressure against the heads 112 is prevented, and any tendency of the bed to oscillate transversely, or to vibrate vertically, as the truck is traveling, is overcome.

Preparatory to operating the truck with the skip superposed thereon, as above described, the cradle is manually lifted. In this act the brackets 72 engage the flanges 101 of the slide bolts 100, the latter yielding their positions, and as the brackets pass, the said bolts returning to their projected positions and becoming engaged on the undersides of said brackets. The cradle thus is retained in elevated position with its feet clear of the ground, as shown in Figure 9. For retaining of the cradle at a higher plane, (as indicated by the broken lines in Figure 9) it is lifted again; whereupon the brackets 70 pass and they become engaged on their undersides, by the said slide bolts.

The truck with its loaded skip aboard, may be operated as usual to destination.

Emptying the bed, is accomplished as follows; (see Figure 9).

Lever 110 is operated in the direction of arrow C, thereby lifting the hooks and unlocking the end gate. Then with the raising of the hoist frame on its pivotal connection 2, the end gate swings open and the contents of the bed are discharged. Upon the returning of the hoist frame to its normal lowered status the gate swings to closed position. Then by operating the lever 110 in the direction of arrow D, the gate is again locked. The truck, with its empty skip, is then returned to the place where the skip is to be demounted and detached.

Demounting the skip and detaching it from the truck is accomplished as follows;

Lever 41 is operated in the direction of arrow B (see Figure 8) causing the detents 35 which are now impinging against the arms 113 to move the latter toward the bed, the slide bolts 100 being thereby retracted. The slide bolts in this movement, having passed from under the brackets 72, the cradle drops, its feet 63 being on the ground, and its position being as shown in Figure 8. The chuck bars 125, (see Figure 14) are now brought about manually, with their free ends in engagement with the ratchet 88 of the corner posts of the bed.

The truck is now operated slightly rearwardly, the rear end of the bed being thereby raised sufficiently to be clear of the runways 3, and the chuck bars 125 having become engaged with the next lower ratchet teeth. The rear end of the bed is now supported in its raised position, by the cradle. Lever 41 is then operated in the direction of arrow F, see Figures 6 and 8, the finger 38 thereby raising the pawl 76 to position clear of the retention lip 31. The truck is now operated forwardly, the runways 3 sliding from under the runners 54, and the deck plate 15 sliding along under the pawl 76 which is resting thereon. As the forward movement of the truck is completed, the pawl 76 drops to engagement with the draft lip 7. At this stage, the position of the bed, with reference to that of the truck, is as shown in Figure 6. Stop bar 25 is then swung over manually to the broken line position indicated in Figure 12, its end projecting above the plane of the runways 3. The truck is now operated rearwardly, the stop bar 25 becoming impinged against the forward end of the bed, and the cradle rolls backwardly (see arrow G in Figure 8) and the chuck bars 125 become disengaged from the ratchet teeth and drop to position as shown in Figure 14. The bed becomes gradually lowered (see Figure 7), and with the completion of the rearward movement of the truck, it will have been brought to the position as shown in Figure 1, the cross beam 68 coming to rest underneath the runners 54, and the lower edge of the end gate being on the ground. See Figure 5.

By the urge of the springs 116, the slide bolts 100 will have returned to their projected position. Hand crank 20 (see Figure 5) is now operated, the tongue 17 being thereby moved to raised position where it is retained, and will have raised the pawl 76 clear of the draft lip 7. The skip is now in detached status. As the truck is operated forwardly, and the plane 5 passes from under the pawl 76, the latter drops to its initial position. The skip, as shown in Figure 1, is now in position to receive another charge of material.

It is intended that a number of these skips may be provided for use in the place where material is to be handled, there being one or more of the skips filled and in readiness at all times to be picked up. Accordingly the truck may be operated on a substantially constant schedule, there being no delays incident to the filling of the skip, or the mounting of the load on the truck.

Whereas the devices for lifting the pawl 76, namely the tongue 17 and the finger 38, are for convenience in the present installation made a part of the runway frame structure, it will be understood that devices for performing the above function, may be embodied in the skip bed structure.

By my invention, the advantage of the use of a mobile power driven vehicle which is capable of moving and hauling heavy loads under varying and difficult conditions, is had. At the same time there is the facility whereby the filling of the bed may be done at the place where same is immediately available from the source of supply. The time required for mounting the load on the truck being minimized, and my improved skip making possible the having of a charge at all times in readiness to be transported, the number of trucks necessary for the handling of a given amount of production, is minimized.

It will be understood that in instances where the material or merchandise to be handled is of a nature that the skip should be lowered before the bed is to be emptied, the invention may be practiced without the hoisting of the skip and the consequent dumping of its contents. Therefore the invention may be used in connection with a truck which does not include the hoisting feature. In either instance, the procedure of lowering the skip and detaching it from the truck, is the same as hereinbefore described. In using the invention in the manner aforesaid, if the opening of the end gate is desirable, the first step in the procedure is that of operating the lever 110. If it is desirable that the end gate shall remain closed, then the first step in the procedure is that of operating the lever 41 in the direction of arrow B.

The above last named manner of practicing the invention is desirable when the goods handled are of a class comprising heavy, special, and bulky packages or units that in the unloading thereof, are preferably, if not necessarily, handled on a plane which is relatively close to the ground.

Whereas the conformation and arrangement of the several parts, and the details of construction shown, are practicable for carrying my invention into effect, it will be understood that changes and modifications may be made, within the scope of the invention as it is defined in the appended claims, without departing from the spirit of the invention or sacrificing any of its advantages.

What I claim as my invention, is—

1. In apparatus of the kind described, the combination with a truck including a hoisting frame at its rear and operating means therefor, runways thereon, a bed with runners to engage said runways, and having a hingedly supported end gate, means to lock and to unlock said end gate, a coupling device at the front end of the bed, a draft connection at the rear portion of the hoist frame engageable by said coupling device when the truck is moved rearwardly to engagement with the said bed, a rollable support device upon which the bed is pivotally mounted at its rear portion and which said device is operable when the truck is moved forwardly, to lift the bed to a predetermined height, and when moved rearwardly, to lower the bed, movable members on said bed and which are engageable by said rollable support device to hold the latter against movement when the bed is in the raised position, a retention connection at the front portion of the hoisting frame engageable by said coupling device, and means operable to disengage the movable members from the rollable support device when the truck will have been moved to rearward position, a stop bar at the rear end of the hoisting frame and which is operable to a plane above that of the runways, and means to move the coupling device to uncoupled status.

2. Same as claim 1 plus chucking means between the rotatable support device which are operable when the truck is moved rearwardly thereby raising the rear portion of said bed, to hold said bed at the higher level, until the rollable support device is unlocked.

3. In combination with a motor vehicle having a longitudinal runway on the rear portion of its chassis, a draft connection at the rear end of the runway, and a retention connection at the forward portion of the runway, a bed, a cradle structure embodying opposed aligned eccentric sectors, the axes of said sectors being pivotally connected to the sides of the bed, a cross member united with said sectors at such position and the sectors being so poised with relation to the bed, that the outer end of the short radius of the cradle, and the lower end of the bed, are substantially equidistant from the perpendicular of the cradle axis, a coupler device at the forward end of the bed adapted to become engaged with, and to be disengaged from said draft connection, and which is also adapted to become engaged with and to be disengaged from the said retention connection, devices to lock the cradle against movement when the motor vehicle will have drawn the bed forwardly and the cradle will have elevated the bed to the plane of the runway, means to unlock said cradle when the motor vehicle will have moved rearwardly to position underneath the bed, and connections between the bed and the cradle to retain the latter at raised position when the bed is in position superposed on the said runway.

4. In combination with a motor vehicle having a longitudinal runway on the rear portion of the chassis, a draft connection at the rear end, and a retention connection at the forward end of the said runway, a bed, a cradle structure embodying opposed aligned eccentric sectors whose axes are pivotally connected to the sides of said bed, a cross strut between the said sectors to stay the latter and to engage the underside of the bed whereby the short radius of the cradle is at one side, and the lower end of the bed is at the opposite side of the perpendicular of the cradle axis, a coupler device at the forward end of the bed adapted to become engaged with, and to be disengaged from said draft connection, and which is also adapted to become engaged with and to be disengaged from the said retention connection, lock bolts on the bed and which are retained yieldingly in projected position and which become engaged by said cross strut when the motor vehicle will have drawn the bed forwardly and the cradle will have elevated the bed to a predetermined height, the cradle being thereby locked against movement, and means to retract said lock bolts whereby to unlock said cradle structure when the motor vehicle will have moved rearwardly to position underneath the bed, and lugs on the cradle which are engageable by said lock bolts to retain the cradle at raised position, when the bed is in the superposed position.

5. In combination with a motor vehicle having a longitudinal runway on the rear portion of the chassis, a draft connection at the rear end of the chassis, an inclined plate leading to said draft connection, a retention connection at the forward end of the runway, a bed, a cradle structure embodying opposed aligned involute sectors whose axes are pivotally connected to the sides of the bed, a cross strut between said sectors to engage the underside of the bed at such position with relation to the axis of the cradle and the short radius of the cradle, that the bed is retained in an inclined position, its lower end being on a plane with the short end of the cradle, a coupler pawl at the front end of the bed and which by gravity is normally in lowered position to a plane below that of the bottom of the bed, lock bolts on the bed and which are retained in projected position and which become engaged by said cross strut when the motor vehicle will have drawn the bed forwardly and the cradle will have elevated the bed to the plane of said runway, the cradle being thereby locked against movement, means to retract said lock bolts whereby to unlock said cradle structure when the motor vehicle will have moved rearwardly to position underneath the bed, a stop bar operable to position above the plane of the runway at the rear end thereof, means to lift the coupler pawl at the retention connection, and means operable to raise the coupler pawl, after the movement of the truck rearwardly will have returned the bed to lowered and inclined position.

6. In combination with a motor truck having a runway on the rear portion of the chassis, a draft lip at the rear end of the runway, an inclined plate leading to said draft lip, a retention lip at the forward end of the runway, a bed, a cradle structure embodying opposed aligned involute sectors whose axes are pivotally connected to the sides of the bed, a cross strut between said sectors to engage the underside of the bed at such position with relation to the axis of the cradle and the short radius of the cradle, that the bed is retained in an inclined position, its lower end being on a plane with the short end of the cradle, a coupler pawl at the front end of the bed and which by gravity is normally in lowered position below the plane of the bottom of the bed, lock bolts on the bed and which are retained in projected position and which become engaged by said cross strut when the truck will have drawn the bed forwardly and the cradle will have elevated the bed to the plane of said runway, the cradle being thereby locked against movement, means to retract the said lock bolts whereby to unlock said cradle structure when the truck will have moved rearwardly to position underneath the bed, connections to retain the cradle in position raised above the ground, means to retract the lock bolts the cradle being thereby released to drop to the ground, chuck bars operable between the cradle and the rear end of the bed whereby when the truck is moved slightly rearwardly the rear end of the bed is raised clear of the runway and it is supported by the cradle, and which said chuck bars become inoperative as the truck moves forwardly, means to raise the coupler pawl clear of the retention lip, a stop bar operable to position above the plane of the runway at the rear end thereof, and means to raise the coupler pawl clear of the draft lip after the movement of the truck rearwardly will have returned the bed to initial inclined position.

7. A skip of the kind described and which is adapted to be superposed upon, and removed from the chassis of a motor vehicle, consisting of a material receiving and retaining bed, a cradle structure including opposed aligned involute sectors whose axes are pivotally connected to the sides of the bed, a cross strut between the said sectors to stay the latter and to engage the underside of the bed whereby the shorter radius of the cradle is at one side, and the rear end of the bed is at the opposite side of the perpendicular of the cradle axis, a hinged end gate at the rear end of the bed, means to lock and to unlock said end gate, a coupler device at the front end of the bed, and connections between the bed and the sectors whereby the cradle may be retained in raised position when the skip is in position superposed on the said vehicle.

SCOTT D. MILLIGAN.